Figure 1:
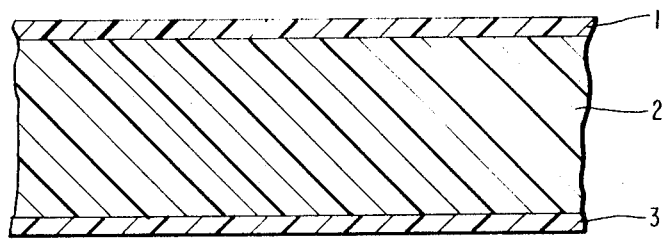

United States Patent

[11] 3,620,825

[72] Inventors Harald Lohmann
Wiesbaden-Biebrich;
Horst Diener, Frankfurt-Hochst, both of Germany
[21] Appl. No. 809,112
[22] Filed Mar. 21, 1969
[45] Patented Nov. 16, 1971
[73] Assignee Kalle Aktiengesellschaft
Wiesbaden-Biebrich, Germany
[32] Priority Mar. 22, 1968
[33] Germany
[31] P 17 69 028.7

[54] EXTRUSION-COATED, BIAXIALLY ORIENTED POLYPROPYLENE FILM HAVING IMPROVED ADHESION CHARACTERISTICS
2 Claims, 2 Drawing Figs.
[52] U.S. Cl. .................................................. 117/138.8 E,
117/7, 117/68, 117/76 F, 117/122 H, 117/161 H, 117/161 UF
[51] Int. Cl. ..................................................... B32b 27/32, B32h 27/08
[50] Field of Search ......................................... 117/138.8 E, 161 UF, 161 H; 161/252; 117/7

[56] References Cited
UNITED STATES PATENTS
| 2,927,047 | 3/1960 | Schulde et al. | 117/138.8 E |
| 3,258,340 | 6/1966 | Riboni | 117/138.8 E |
| 3,285,766 | 11/1966 | Barkis et al. | 117/138.8 E |

FOREIGN PATENTS
| 700,482 | 12/1964 | Canada | 117/138.8 E |

Primary Examiner—William D. Martin
Assistant Examiner—Ralph Husack
Attorney—James E. Bryan ABSTRACT: This invention relates to a biaxially oriented film of isotactic polypropylene which has improved adhesion characteristics, the film being provided on at least one surface with a coating of an isotactic polypropylene or a mixture of isotactic polypropylene and up to 15 percent by weight, based on the total weight of the polymer, of nonisotactic polypropylene, or a mixed polymer or copolymer of propylene and up to 15 percent by weight, based on the total weight of the polymer, of ethylene, the coating being substantially unoriented in the first stretching direction and less oriented than the base film in the second stretching direction.

PATENTED NOV 16 1971　　　3,620,825

INVENTORS
HARALD LOHMANN
HORST DIENER

BY

ATTORNEY

EXTRUSION-COATED, BIAXIALLY ORIENTED POLYPROPYLENE FILM HAVING IMPROVED ADHESION CHARACTERISTICS

This invention relates to a biaxially oriented film of isotactic polypropylene which has extrusion-coated thereon, on one or both surfaces, a relatively thin adhesive layer of isotactic polypropylene or of mixtures containing isotactic polypropylene.

Films of isotactic polypropylene which have been oriented in one direction or in two orthogonal directions by stretching them at a temperature below their crystallite melting point are suitable for many fields of application, because of their mechanical strength, their optical clarity and surface gloss, and their low vapor permeability.

However, such films have the significant drawback that, due to the nonpolar character of the material and its high degree of molecular orientation, their adhesion e.g. to heat-sealing layers, metal layers and the like is poor.

Polyethylene or the so-called "hot melts" and copolymers based on vinyl acetate, vinyl chloride or nitrocellulose are normally used as heat-sealing layers. If it is desired to additionally provide the composite film with good barrier properties towards gases, such as $CO_2$ or $O_2$—properties which are increasingly being required of packaging films—the oriented polypropylene films are provided with heat-sealing layers based on vinylidene chloride copolymers. For metallizing films, e.g. by vapor deposition, aluminum is normally used, but copper, silver or gold also may be employed for special purposes.

For making the surface of biaxially stretched isotactic polypropylene films more suitable for a subsequent coating or metallization process, numerous methods have been proposed, such as a treatment of the films with electric discharges in an atmosphere of air or of special gases, treatment with chemicals, or flame treatment. Surfaces pretreated in this manner form satisfactory composite films when they are combined with copolymers based on vinylidene chloride, vinyl chloride, or vinyl acetate, provided these substances are applied from suitable organic solvents.

The application of coatings from organic solutions has, however, essential disadvantages from the point of view of processing; it requires, e.g., precautionary measures to avoid the danger of explosion and makes it necessary to remove or recover the solvent used. Further, the heat-sealing layers produced in this manner possess no antistatic properties and may be physiologically objectionable. In the case of the important heat-sealing layer based on vinylidene chloride, the barrier properties are, moreover, not fully satisfactory.

For these reasons, there has been a tendency to apply the heat-sealing layers from aqueous dispersions. However, in this case the adhesion of the coating to the supporting film is insufficient for most purposes, despite an intensive pretreatment. Hitherto, this obstacle has been met, on the one hand, by modifying the supporting film in such a manner, by the addition of polyethylene, copolymers of propylene and ethylene, or mixtures of polyethylene and polypropylene, that the subsequent coating process yielded composite films of improved bonding strength. On the other hand, for further improving the adhesion, the already pretreated surface was coated from an aqueous dispersion or an organic solution with an additional base coat or an anchoring layer, and the actual heat-sealing layer having the desired properties was then applied as a top layer, in a second operation.

The application of an additional adhesive layer from an organic solution causes the above-mentioned processing drawbacks, whereas the application from an aqueous dispersion results in a bonding strength which is not sufficient for all purposes.

Moreover, the modification of the homopolymeric isotactic polypropylene by forming copolymers thereof or by adding copolymers or polyethylene thereto results in all cases in a more or less significant reduction of the optical qualities of the polypropylene base film and also causes slight changes in the elastic modulus.

From what is said above, the compromises can be seen which have hitherto been necessary due to the poor adhesion of layers to the surface of biaxially stretched polypropylene.

The present invention provides a biaxially oriented film of isotactic polypropylene, the surface of which is modified in such a manner that the adhesion of subsequently applied coatings is improved.

In the present invention, a biaxially oriented film of isotactic polypropylene is provided on at least one surface with a layer of an isotactic polypropylene, or a mixture of isotactic polypropylene and up to 15 percent by weight, based on the total weight of the polymer, of nonisotactic polypropylene, or a mixed polymer or copolymer of propylene and up to 15 percent by weight, based on the total weight of the polymer, of ethylene, which layer is substantially unoriented in the first stretching direction and less oriented than the base film in the second stretching direction.

Isotactic polypropylenes having a density of 0.880 to 0.920 and melt indices $i_5$ at 230° C. from 4 to 100 g./10 min., preferably from 10 to 50 g. per 10 minutes, measured in accordance with method D 1238–57 T, are suitable for the purposes of the present invention.

Mixtures of isotactic polypropylene containing up to 15 percent by weight, based on the total weight of the polymer, of nonisotactic polypropylene, or mixed polymers or copolymers of propylene and up to 15 percent by weight, based on the total weight of the polymer, of ethylene, may be used as coating materials. Preferably, an isotactic polypropylene is used the fluidity of which may differ from that of the base film. The use of one and the same isotactic polypropylene for the production of the base film and of the coating is particularly advantageous.

The composite film consists of a supporting or base film of biaxially stretched isotactic polypropylene of any desired thickness, which is provided on at least one surface with a coating of the above-described polymers, mixed polymers or copolymers, of a thickness of 0.2 to 4 μm., preferably 0.5 to 1.5 μm.

The composite film according to the invention is prepared by extruding a layer of 1 to 20 μm. thickness, preferably 3 to 10 μm. thickness—if desired after a previous treatment to improve adhesion—onto one or both surfaces of a monoaxially stretched base film obtained after the first stretching operation—which in this case is preferably in the longitudinal direction—of a known process for the biaxial stretching of films of isotactic polypropylene, e.g. by means of the so-called stretching frame method, and then stretching the composite film thus produced transversely to the direction of the first stretching operation. If necessary, the two surfaces may be coated with different polymers. As can be seen from the following examples, particularly example 1, contrary to the first stretching operation, the second stretching operation is performed at a temperature near the crystallite melting point of the polypropylene. This stretching temperature, which is higher than the temperature employed for the first stretching operation, is necessary, since it is known that a film material that already has been oriented in one direction—in this case the base film—requires considerably higher energies when it is to be oriented in the orthogonal direction. However, for the coating applied, which has not yet been oriented in one direction, this temperature is so high that, due to the high molecular mobility, a degree of orientation is achieved which is lower than that of the base film in the second stretching direction. In the first stretching direction, the coating film is only insignificantly oriented, as is normal with unstretched polypropylene films.

As the next step or, alternatively, after an intermediate storage, the surface of the composite film produced in accordance with the invention then may be treated by one of the known methods and provided on one or both surfaces with a layer. Thus, a layer of a heat-sealable material, e.g. a polyvinylidene chloride copolymer, may be applied from an aqueous dispersion, whereupon the composite film is dried and wound up.

Surprisingly, the heat-sealable film thus produced displays a considerably improved adhesion of the heat-sealing layer to the film precoated in accordance with the invention. No additional anchoring layer is necessary. Furthermore, the process can be conducted in a substantially simpler manner. The extrusion of isotactic polypropylene onto a monoaxially stretched base film of isotactic polypropylene can be effected without difficulty. In addition thereto, the good optical properties of the base film are retained.

The advantages of the heat-sealable film produced in accordance with the present invention, as regards quality and processing conditions, will be described in detail by reference to the following examples and the drawings attached.

The evaluation of the qualities of the coated films as given in the examples is based on the following measuring methods:

a. The sealing strength is determined using a strip 1 cm. wide which is cut transversely to the sealing weld of the sample. The force in grams per cm. of strip width measured during delamination in a tension tester at a feed speed of 200 mm./min., serves as a measurement of the sealing strength.

The clamped free ends of the sample should form an angle of about 90° with the still undelaminated film. The sealing weld, which has a width of 15 mm., is produced in a pneumatic sealing device under constant conditions of a temperature of 120° C., a sealing time of 2 seconds, and a pressure of 1.3 kg./cm.$^2$.

b. Sealing strength after boiling for 5 minutes: the test for determining the sealing strength described sub (a) was made after the sample had been immersed for 5 minutes in boiling water.

c. For determining the bonding strength of a polypropylene/polyethylene composite film, the composite film is first cut from the polyethylene surface in such a manner that the polypropylene layer is not damaged. The thus loosened laminate is opened over 15 mm. and the sample is then cut into 10 mm. wide strips. The bonding strength is determined by the so-called T-peel test, at a feed speed of 100 mm./min. For this test, the clamped ends of the base film and of the coating film are drawn apart at an angle of 180°, while the undelaminated composite film is held at an angle of 90° to this direction of movement.

d. The adhesion of a metal layer is determined as follows: A 25 mm. wide strip of an adhesive tape which is available under the designation "Tesafilm" 104, is rolled onto the metal layer with a force of 2.5 kg., using a roller of 40 mm. diameter. The laminate is opened over 15 mm. and clamped into two clips connected to a device for measuring the force. The laminate is then drawn apart by the T-peel method at a feed speed which increases from 2.5 mm./sec. to 150 mm./sec. The force at which the metal layer begins to separate from the polypropylene film and adheres to the adhesive tape, is designated as the bonding strength.

EXAMPLE 1

Isotactic polypropylene having a density of 0.91 and a melt index $i_5$ at 230° C. of 15 g./10 min., measured the ASTM method D 1238–57 T, was extruded and longitudinally stretched at 145° C. at a rate of $\lambda_l=6.0$. The thickness of the longitudinally stretched film 2 (see FIG. 1) was 200 μm.

Figure 2:
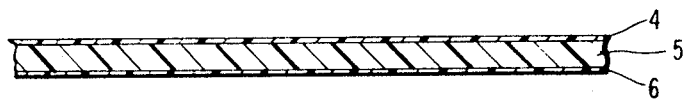

Then, a hot melt at 280° C. of the above-described polypropylene was applied in two layers (layers 1 and 3 of FIG. 1) of a thickness of about 6 μm. each, to both surfaces of the monoaxially stretched polypropylene film, at a rate of 60 m./min., and the composite film was then cooled to 25° C. Thereafter, the film was transversely stretched at a stretching rate $\lambda_t=8.0$ and a stretching temperature of about 165° C. A biaxially oriented film 5 (FIG. 2) of a thickness of 25 μm. was thus obtained which was coated on both surfaces with layers of oriented isotactic polypropylene of about 0.8 μm. thickness (4 and 6 in FIG. 2) which were only insignificantly oriented in the longitudinal direction and less oriented than the base film in the transverse direction.

The composite film was passed through an electric discharge and then coated on both sides with an aqueous dispersion of a polyvinylidene chloride copolymer of 90 percent of vinylidene chloride and 10 percent of acrylonitrile and acrylic acid ester (thickness of the dried layer: 3 μm.), dried at 120° C. in a hot-air drier, and wound up.

The heat-sealable film produced in this manner had the following characteristics:

Heat-sealing strength: 120–140 g./cm.
Heat-sealing strength after boiling for 5 min.: 140 g./cm.

A comparison film which had been produced by the same method, but not coated with isotactic polypropylene after longitudinal stretching, had the following properties:

Heat-sealing strength: 30–50 g./cm.
Heat-sealing strength after boiling for 5 min.: 30–50 g./cm.

EXAMPLE 2

A heat-sealable film was prepared as described in example 1. Additionally, the longitudinally stretched polypropylene film was treated with an electric discharge before extrusion coating. The resulting film had the following characteristics:

Heat-sealing strength: 100–150 g./cm.
Heat-sealing strength after boiling for 5 min.: 120–140 g./cm.

EXAMPLE 3

A heat-sealable film was again prepared as described in example 1, with the exception that in addition to the treatment with an electric discharge, the longitudinally stretched film was cooled only to 100° C., extrusion coated at this temperature, and then transversely stretched as in example 1. The following values were obtained:

Heat-sealing strength: 120–160 g./cm.
Heat-sealing strength after boiling for 5 min.: 130–150 g./cm.

EXAMPLE 4

A longitudinally stretched film of isotactic polypropylene having the physical characteristics stated in example 1 was extrusion-coated on one surface with a layer of about 6 μm. thickness of the same isotactic polypropylene, to which 10 percent by weight of atactic polypropylene of a density of 0.86 had been added. After the second stretching operation, the film was provided as in example 1 with a heat-sealable layer for which the following characteristics were determined:

Heat-sealing strength: 120–140 g./cm.
Heat-sealing strength after boiling for 5 min.: 120–140 g./cm.

EXAMPLE 5

A longitudinally stretched film of isotactic polypropylene having the physical characteristics described in examples 1 was extrusion-coated on one surface with a layer of about 5 μm. thickness consisting of the same isotactic polypropylene blended with 4 percent by weight of polyethylene having a density of 0.918.

After the second stretching operation, the film was provided as in example 1 with a heat-sealable layer of which the following characteristics were determined:

Heat-sealing strength: 120–160 g./cm.
Heat-sealing strength after boiling for 5 min.: 120–160 g./cm.

EXAMPLE 6

A longitudinally stretched film of isotactic polypropylene having the physical characteristics described in example 1 was extrusion-coated on one surface with a layer of about 10 μm. thickness of a copolymer consisting of 93 percent by weight of propylene and 7 percent by weight of ethylene and having a melt index $i_s$ at 230° C. of 13.1 g./10 min., measured by the ASTM method D 1238–57 T.

After the second stretching operation, the film was provided as in example 1 with heat-sealable layer of which the following characteristics were determined:

| | |
|---|---|
| Heat-sealing strength: | 100–150 g./cm. |
| Heat-sealing strength after boiling for 5 min.: | 100–150 g./cm. |

EXAMPLE 7

A film of isotactic polypropylene which had been longitudinally stretched as described in example 1 was extrusion-coated, by means of an appropriate two-component nozzle, on one surface with a 4 μm. thick layer of isotactic polypropylene of the same characteristics as in example 1 and with a 16 μm. thick layer of polyethylene of a density of 0.918 in such a manner that the polypropylene layer was between the longitudinally stretched polypropylene film and the polyethylene layer. The composite film thus produced was transversely stretched at a temperature of 160° C. and a stretching rate $\lambda_t=$ 8.0 and then wound up.

In order to determine the bonding strength of the polyethylene coating on the polypropylene layer more accurately, instead of the usual evaluation of the heat-sealing strength, the composite film produced was additionally extrusion-coated on its polyethylene surface with a 75 μm. thick layer of polyethylene of a density of 0.918, so that the polyethylene coating could be peeled off without breaking.

The bonding strength was 30–40 g./cm., whereas a composite film which had been prepared in the same manner, but without an intermediate layer of polypropylene, had a bonding strength of only 15–20 g/cm.

EXAMPLE 8

A biaxially stretched polypropylene film which had seen prepared as described in example 1 was provided with an aluminum layer in the normal manner, by vacuum deposition.

The bonding strength of the metal layer to the po polypropylene film was 400 g./cm., whereas a composite material which had been prepared in the same manner, but without an intermediate layer of polypropylene, had a bonding strength of only 240 g./cm.

It will be obvious to those skilled in the art that many modifications may be made within the scope of the present invention without departing from the spirit thereof, and the invention includes all such modifications.

What is claimed is:

1. A biaxially oriented film of isotactic polypropylene of improved adhesion characteristics having a coating on at least one surface thereof consisting essentially of an isotactic polypropylene; or a mixture of isotactic polypropylene and not more than 15 percent by weight, based on the total weight of the polymer, of nonisotactic polypropylene; or a mixture of polypropylene and not more than 15 percent by weight, based on the total weight of the polymer, of polyethylene; or a copolymer of propylene and not more than 15 percent by weight, based on the total weight of the copolymer, of ethylene; the coating being substantially unoriented in the first stretching direction and oriented but less oriented than the base film in the second stretching direction, and the coating having a thickness in the range of about 0.2 to 4 μm.

2. A film according to claim 1 in which the coating is of the same isotactic polypropylene as the base film.

* * * * *